United States Patent Office 3,396,009
Patented Aug. 6, 1968

3,396,009
CHEMICAL CONTROL OF WEEDS IN SUGAR BEETS
Ralph P. Neighbors, Olathe, Kans., assignor to Gulf Research & Development Company, Pittsburgh, Pa., a corporation of Delaware
No Drawing. Continuation-in-part of application Ser. No. 374,813, June 12, 1964. This application Apr. 20, 1966, Ser. No. 543,789
6 Claims. (Cl. 71—115)

ABSTRACT OF THE DISCLOSURE

Weeds in sugar beet fields, particularly species of Kochia are controlled by applying to the locus of the weeds benzamidooxyacetic acid or a salt thereof at a rate of about ½ to 6 pounds per acre.

---

This is a continuation-in-part of U.S. patent application Ser. No. 374,813, filed June 12, 1964.

In the parent application it was disclosed that certain amidoxy and imidoxy alkanoic acids and their salts may be used to control weeds in small grains, sugar beets, flax, safflower and cotton. It has now been discovered that one of these compositions is particularly useful in controlling weeds in sugar beets because of its unique ability to control Kochia (tumbleweed). Benzamidooxyacetic acid and salts thereof are known compositions which may be readily prepared by published methods, as, for example, the procedure disclosed in J. Chem. Soc., p. 227 (1960), which is referred to in the parent application.

Sugar beets are advantageously grown in fertile irrigated soils in arid areas of the western United States where *Kochia scoparia* and related species of annual weeds are common pests. Unfortunately irrigation provides ideal growth conditions for Kochia, which may reach a height of as much as six or seven feet, unless removed by hand weeding. In the past there has been no effective chemical method of controlling Kochia in sugar beets and hand weeding produces injuries which result in loss of about 5 to 8 percent of the sugar beet plants.

Briefly, my method of controlling weeds in sugar beets comprises applying to the locus of the weeds a herbicidal quantity of a compound selected from the group consisting of benzamidooxyacetic acid and salts thereof. Preferably, the herbicide is applied in the form of a spray of an aqueous dispersion or solution of the acid or the alkali metal salt such as sodium, potassium, alkaline earth metal salt such as calcium or ammonium salts thereof. The aqueous spray formulation may be of a conventional type, employing solvents and surface active agents. The spray volume does not appear to be particularly critical. The activity of the herbicidal composition is such that it may be applied in the field at a rate within the range of from about ½ to 6 pounds per acre, preferably about 1 to 4 pounds per acre. The method will be fully understood by reference to the following discussion and illustrative examples.

EXAMPLE I

The post-emergent effectiveness of the weed control method was demonstrated in greenhouse tests with cotton, sugar beets and several species of weeds which had been grown in 4-inch pots under conditions such that there was about 15 hours of illumination during each day. The plants were about one month old, were still growing and were not producing seed. The sugar beet plants had 2 to 4 leaves and stood about 2.5 to 4 inches high.

A commercial emulsifier was employed to make an aqueous dispersion of benzamidooxyacetic acid in four different concentrations so that the active compound could be applied at rates of ½, 1, 2 and 4 pounds per acre at a spray volume of 20 gallons per acre. Three pots of each species were tested at each application rate.

The plants were sprayed with aqueous spray formulation under a pressure of 40 p.s.i. and were then observed during the following week for the effect of the herbicide.

At all application rates, substantial control of Kochia, wild buckwheat and green foxtail was obtained, with significant injury to sugar beets occurring only at 4 pounds per acre. (The injury was less than customarily results from hand weeding, however.) At 1 and 2 pounds per acre, control of Kochia, wild buckwheat and green foxtail appeared to be almost 100 percent, with no significant effect on sugar beets.

Usually it is true with any crop plant that there is a particular stage of growth at which a selective herbicide can be used against weeds of about the same age to best advantage. With the present method it appears that sugar beets have the best advantage when the first two leaves are larger than the seed leaves but before the third leaf is one inch long. When spraying is conducted at this stage, complete control of Kochia is feasible because all of the Kochia can be killed before it produces seed. Although mature Kochia is killed by the method of this invention, it is wasteful and inefficient to delay the use of the herbicide until after the Kochia has produced seed.

The following example illustrates the practical use of the weed control method in the field.

EXAMPLE II

A water-dispersible concentrate is prepared with the following composition:

|  | Percent |
| --- | --- |
| Benzamidooxyacetic acid | 25 |
| Surfactant (anionic-nonionic blend) | 25 |
| NH$_4$OH (28%) | 10 |
| Water | 40 |

The water dispersible concentrate is diluted with water so as to yield desired spray volumes of about 10 to 60 gallons per acre.

Sugar beets having from two to about eight true leaves are sprayed with the aqueous spray mixture prepared as described above at application rates within the range of ½ to 6 pounds and preferably about 1 to 4 pounds of benzamidooxyacetic acid per acre of sprayed area.

After about one to four weeks, a count of dead and injured plants indicates consistently rates of control approximately as follows:

| Weed species: | Percent control, over |
| --- | --- |
| *Kochia scoparia* | 90 |
| *Chenopodium album* (lambsquarters) | 70 |
| *Setaria viridis* (green foxtail) | 70 |

A water-dispersible concentrate composition of the illustrated type is very dependable in performance, mixing rapidly and easily on dilution, regardless of temperature, hardness of water or other factors commonly encountered in the field. It will be understood, of course, that the concentrate can be made cheaper, particularly by reducing the amount of surfactant present. Other basic substances may also be employed instead of ammonium hydroxide such as sodium carbonate, potassium hydroxide, calcium oxide or an alkyl dimethyl benzyl ammonium hydroxide. However, ammonium hydroxide is cheap and convenient to use, yielding clear aqueous spray mixtures which are apparently homogeneous and are not inclined to form deposits in spray equipment or to corrode steel, aluminum or brass.

In the method of this invention other herbicides may be employed before, after or along with the benzamidooxyacetic acid, so as to control other noxious weeds, such as pigweed. Since pigweed seems to thrive in almost all fertile areas where moisture is adequate, it often appears along with Kochia in irrigated fields. In a preferred embodiment of the method, therefore, a pigweed herbicide is employed in combination with the herbicide which is effective against Kochia. A useful pigweed herbicide for this purpose is PCA (5-amino-4-chloro-2-phenyl-3(2H) pyridazinone), provided that spraying is carried out when the pigweed is only about 4 inches or less in height. Since the benzamidooxyacetates are compatible with most other herbicides, various combinations may be made within the skill of the art, so as to suit the method to a specific problem situation.

What is claimed is:

1. The method of controlling weeds in sugar beet fields which comprises applying a herbicidal quantity of benzamidooxyacetic acid in the form of an aqueous spray composition selected from the group consisting of aqueous dispersions and solutions of benzamidooxyacetic acid, its alkali metal salts, its alkaline earth metal salts and its ammonium salts.

2. The method of controlling weeds in sugar beet fields which comprises applying ammonium benzamidooxyacetate to the locus of growth of one of the species of Kochia at a rate of about 1 to 4 pounds per acre.

3. The method of claim 1 in which sodium benzamidooxyacetate is applied to the locus of the weeds.

4. The method of claim 1 in which potassium benzamidooxyacetate is applied to the locus of the weeds.

5. The method of claim 1 in which calcium benzamidooxyacetate is applied to the locus of the weeds.

6. The method of claim 1 in which alkyl dimethyl benzyl ammonium benzamidooxyacetate is applied to the locus of the weeds.

References Cited
UNITED STATES PATENTS

| | | | |
|---|---|---|---|
| 3,210,353 | 10/1965 | Reicheneder et al. | 71—92 |
| 3,287,105 | 11/1966 | Reicheneder et al. | 71—92 |
| 2,412,510 | 12/1946 | Jones | 71—2.6 |
| 3,014,965 | 12/1961 | Newcomer et al. | 71—2.6 XR |
| 3,056,669 | 10/1962 | Moyle et al. | 71—2.6 |
| 3,162,525 | 12/1964 | Leasure | 71—2.7 |

LEWIS GOTTS, *Primary Examiner.*

G. HOLLRAH, *Assistant Examiner.*

UNITED STATES PATENT OFFICE
CERTIFICATE OF CORRECTION

Patent No. 3,396,009                    Dated  August 6, 1968

Inventor(s)   Ralph P. Neighbors

It is certified that error appears in the above-identified patent and that said Letters Patent are hereby corrected as shown below:

In the heading to the printed specification, lines 4 to 6, "Gulf Research & Development Company, Pittsburgh, Pa., a corporation of Delaware" should read -- Gulf Oil Corporation, Pittsburgh, Pa., a corporation of Pennsylvania --.

Signed and sealed this 2nd day of November 1971.

(SEAL)
Attest:

EDWARD M. FLETCHER, JR.         ROBERT GOTTSCHALK
Attesting Officer               Acting Commissioner of Patents